(No Model.)

W. H. H. HALLOCK.
SHAFT FOR VEHICLES.

No. 591,399. Patented Oct. 12, 1897.

WITNESSES:
John Buckler,
C. Gerst

INVENTOR
William H. H. Hallock.
BY
Edgar Tate & Co
ATTORNEYS.

UNITED STATES PATENT OFFICE.

WILLIAM H. H. HALLOCK, OF MANORVILLE, NEW YORK.

SHAFT FOR VEHICLES.

SPECIFICATION forming part of Letters Patent No. 591,399, dated October 12, 1897.

Application filed June 13, 1896. Serial No. 595,409. (No model.)

*To all whom it may concern:*

Be it known that I, WILLIAM H. H. HALLOCK, a citizen of the United States, and a resident of Manorville, in the county of Suffolk and State of New York, have invented certain new and useful Improvements in Shafts for Vehicles, of which the following is a specification, reference being had to the accompanying drawings, forming a part thereof, in which similar letters of reference indicate corresponding parts.

This invention relates to supports for the shafts of buggies, carriages, and similar vehicles; and the object thereof is to provide a device of this class by which the weight of the shafts will be removed from the horse;- and with this and other objects in view the invention consists in the construction, combination, and arrangement of parts hereinafter described and claimed.

The invention is fully disclosed in the following specification, of which the accompanying drawings form a part, in which—

Figure 1:
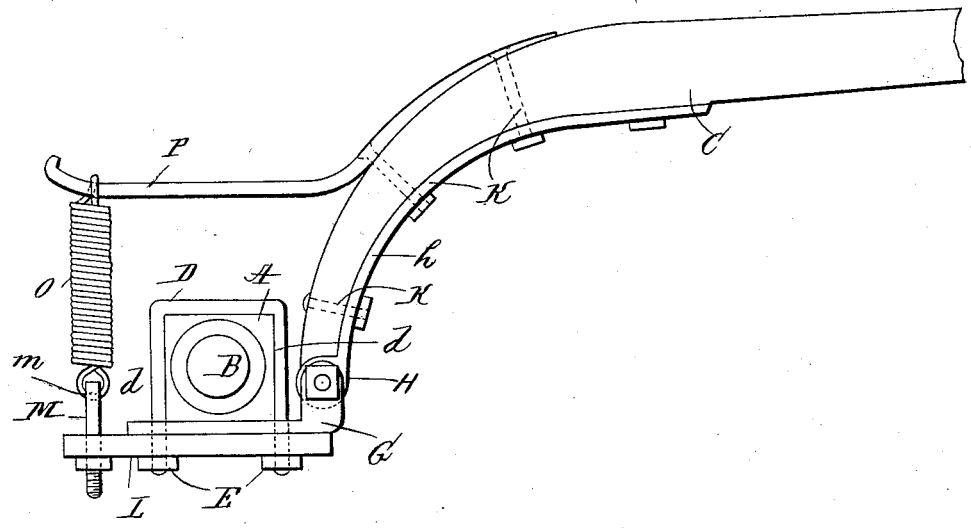
Figure 2:
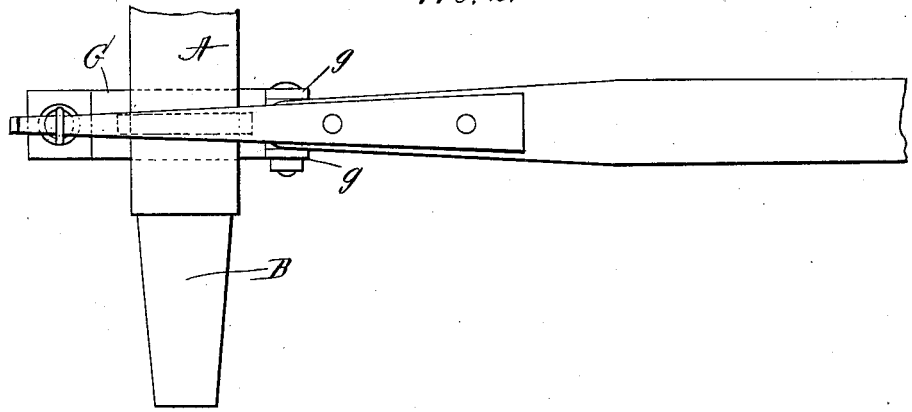

Figure 1 is a side view of a shaft connected with a vehicle and provided with my invention, and Fig. 2 a plan view thereof.

In the drawings forming part of this specification, A represents the shaft of a buggy, carriage, or other vehicle, B the spindle thereof, and C one of the shafts; and in the practice of my invention I secure the shaft to the axle by means of a yoke D, the sides *d* of which extend below the axle and are provided with screw-nuts E.

Mounted below the axle on the sides *d* of the yoke D is a plate G, provided with upwardly-directed jaws *g*, between which are pivoted the end of the shaft C or the head H of the curved plate *h*, which is secured thereto by means of bolts K.

Below the plate G and mounted on the sides *d* of the yoke D is another plate L, to the rear end of which is secured a bolt M, which passes therethrough, the upper end of which is provided with an eye *m*, and secured to the upper end of this bolt is a strong spiral spring O, the upper end of which is connected with the rear end of a strong metal bar P, the forward end of which is upwardly curved and connected with the shaft C by the bolts K, which pass therethrough.

By means of this device it will be observed that the shaft C will be held in a horizontal position, or practically so, at all times, and that the weight thereof will be removed from the horse, and it will also be apparent that two shafts may be supported in this manner on a single tongue or pole. It will also be apparent that shafts thus connected with a vehicle will serve to support a horse if the latter should stumble and to prevent it from falling; and my invention is not limited to the exact means herein shown and described for making the connection with the axle.

In place of the plates G and L a single plate may be employed, and other changes in and modifications of the construction may be made without departing from the spirit of my invention or sacrificing its advantages, and I therefore reserve the right to make all such alterations therein and modifications thereof as fairly come within the scope of the invention.

Having fully described my invention, I claim as new and desire to secure by Letters Patent—

The herein-described device, consisting of a shaft which is pivotally connected with a vehicle by means of the usual plate and yoke, the arms of said yoke being extended and adapted to receive a supplemental plate thereon, a bolt attached to the rear end of said supplemental plate, the upper end of said bolt being provided with an eye, an arm secured to the said shaft at the upper side thereof, said arm conforming to the outline of the shaft for a part of its length when it projects therefrom in a line parallel with said supplemental plate, and provided with a hook at the end of said projection, and a spiral spring engaging said eye and said hook, all substantially as shown and described, and for the purpose set forth.

In testimony that I claim the foregoing as my invention I have signed my name, in presence of the subscribing witnesses, this 26th day of December, 1895.

WILLIAM H. H. HALLOCK.

Witnesses:
C. GERST,
L. M. MULLER.